(12) United States Patent
Han et al.

(10) Patent No.: US 11,822,106 B2
(45) Date of Patent: Nov. 21, 2023

(54) META OPTICAL DEVICE AND ELECTRONIC APPARATUS INCLUDING THE SAME

(71) Applicants: SAMSUNG ELECTRONICS CO., LTD., Suwon-si (KR); UNIVERSITY OF MASSACHUSETTS, Boston, MA (US)

(72) Inventors: Seunghoon Han, Seoul (KR); Mahdad Mansouree, Boston, MA (US); Amir Arbabi, Boston, MA (US); Sangeun Mun, Seoul (KR)

(73) Assignees: SAMSUNG ELECTRONICS CO., LTD., Suwon-si (KR); UNIVERSITY OF MASSACHUSETTS, Boston, MA (US)

( * ) Notice: Subject to any disclaimer, the term of this patent is extended or adjusted under 35 U.S.C. 154(b) by 290 days.

(21) Appl. No.: 17/229,425

(22) Filed: Apr. 13, 2021

(65) Prior Publication Data

US 2021/0405270 A1  Dec. 30, 2021

Related U.S. Application Data

(60) Provisional application No. 63/044,605, filed on Jun. 26, 2020.

(30) Foreign Application Priority Data

Nov. 23, 2020 (KR) .................. 10-2020-0158028

(51) Int. Cl.
*G02B 5/18* (2006.01)
*G02B 5/30* (2006.01)
*G02B 1/00* (2006.01)

(52) U.S. Cl.
CPC .......... *G02B 5/1871* (2013.01); *G02B 1/002* (2013.01); *G02B 5/3083* (2013.01); *G02B 2207/101* (2013.01)

(58) Field of Classification Search
CPC .. G02B 5/1871; G02B 5/3083; G02B 5/1866; G02B 5/1809; G02B 1/002; G02B 2207/101; B82Y 20/00
See application file for complete search history.

(56) References Cited

U.S. PATENT DOCUMENTS 9,160,077 B2  10/2015  Liu et al.
10,578,721 B2  3/2020  Jang et al.
(Continued)

FOREIGN PATENT DOCUMENTS

KR  10-2020-0067074 A  6/2020

OTHER PUBLICATIONS

Amir Arbabi et al., "Subwavelength-thick lenses with high numerical apertures and large efficiency based on high-contrast transmitarrays", Nature Communications, May 7, 2015, vol. 6, No. 7069, pp. 1-6 (6 pages total).

*Primary Examiner* — Derek S. Chapel
*Assistant Examiner* — Adam W Booher
(74) *Attorney, Agent, or Firm* — Sughrue Mion, PLLC

(57) ABSTRACT

Provided is a meta optical device including a plurality of phase modulation regions respectively including a plurality of nanostructures that have shapes and arrangement based on a preset rule, the plurality of phase modulation regions being configured to modulate a phase of incident light of a preset wavelength band, wherein at least two phase modulation regions of the plurality of phase modulation regions have phase modulation ranges in a first direction that are same, and wherein the plurality of nanostructures included
(Continued)

in the at least two phase modulation regions have width ranges in the first direction that are different from each other.

23 Claims, 21 Drawing Sheets

(56) References Cited

U.S. PATENT DOCUMENTS

| | | |
|---|---|---|
| 2016/0299337 A1 | 10/2016 | Arbabi et al. |
| 2019/0049235 A1* | 2/2019 | Han ..................... H01S 5/183 |
| 2019/0154877 A1 | 5/2019 | Capasso et al. |
| 2020/0174163 A1 | 6/2020 | Han et al. |
| 2021/0044748 A1* | 2/2021 | Hu ..................... H04N 23/698 |

* cited by examiner

META OPTICAL DEVICE AND ELECTRONIC APPARATUS INCLUDING THE SAME

CROSS-REFERENCE TO RELATED APPLICATIONS

This application claims priority to Korean Patent Application No. 10-2020-0158028, filed on Nov. 23, 2020, in the Korean Intellectual Property Office, and claims benefit to U.S. Provisional Patent Application No. 63/044,605, filed on Jun. 26, 2020, in the United States Patent and Trademark Office, the disclosures of which are incorporated by reference herein in their entireties.

BACKGROUND

1. Field

Example embodiments of the present disclosure relate to a meta optical device and an electronic apparatus including the same.

2. Description of the Related Art

A flat diffraction device including a meta-structure may exhibit various optical effects that conventional refraction devices cannot achieve. Thus, such a flat diffraction device may be used to implement a thin optical system, and accordingly, interests in using the fiat diffraction device in many fields have increased.

The meta-structure includes a nanostructure having a shape, period, etc. less than the wavelength of the incident light and the nanostructure is designed according to a phase profile set for each position such that the desired optical performance is obtained for light of a desired wavelength band. The diffraction angle of incident light is determined according to this phase profile, and nanostructure design methods that have higher efficiency in the case of various diffraction angles have been studied.

SUMMARY

One or more example embodiments provide a meta optical device that operates in a wide diffraction angle range.

One or more example embodiments also provide an electronic apparatus including a meta optical device.

Additional aspects will be set forth in part in the description which follows and, in part, will be apparent from the description, or may be learned by practice of example embodiments of the disclosure.

According to an aspect of an example embodiment, there is provided a meta optical device including a plurality of phase modulation regions respectively including a plurality of nanostructures that have shapes and arrangement based on a preset rule, the plurality of phase modulation regions being configured to modulate a phase of incident light of a preset wavelength band, wherein at least two phase modulation regions of the plurality of phase modulation regions have phase modulation ranges in a first direction that are same, and wherein the plurality of nanostructures included in the at feast two phase modulation regions have width ranges in the first direction that are different from each other.

The at least two phase modulation regions may have gradients of a phase change in the first direction that are different from each other.

The at least two phase modulation regions may have angles of refraction of the incident light that are different from each other.

Among the at least two phase modulation regions, a phase modulation region in which an angle of refraction of the incident light is greater may have a narrower width distribution.

The plurality of phase modulation regions may include a first phase modulation region having a circular shape and a second phase modulation region to an N-th phase modulation region respectively having an annular shape sequentially surrounding the first phase modulation region of the circular shape, where N is an integer greater than two, and wherein the first direction may be a radial direction away from a center of the first phase modulation region of the circular shape.

Phase modulation ranges h the second to N-th phase modulation regions respectively may be $2\pi$.

The shapes and the arrangement of the plurality of nanostructures of each of the first to N-th phase modulation regions may be set such that an angle of refraction of the incident light gradually increases in the first to N-th phase modulation regions.

Among the at least two phase modulation regions, a first range, which is a width range of nanostructures included in a phase modulation region provided at a central portion of the meta optical device, may be greater than a second range, which is a width range of nanostructures included in a phase modulation region provided at a peripheral portion of the meta optical device.

The first range may be 1.2 times to 1.6 times the second range.

The first range may range from a first width to a second width, and the second range may range from third width to a fourth width, and the first width may be less than the third width and the second width may be greater than the fourth width.

The shapes and the arrangement of nanostructures of each of the first to N-th phase modulation regions may be set such that an angle of refraction of the incident light changes non-linearly in the first to N-th phase modulation regions.

Among the first to N-th phase modulation regions, a first range, which is a width range of nanostructures included in a phase modulation region in which the incident light is refracted at a first angle, may be greater than a second range, which is a width range of nanostructures included in a phase modulation region in which the incident light is refracted at a second angle, the second angle being greater than the first angle.

The first range may be 1.2 times to 1.6 times the second range.

The meta optical device may be a lens having a field of view of 40 degrees to 170 degrees.

The shapes and the arrangement of the plurality of nanostructures included in the plurality of phase modulation regions may be set such that the meta optical device is configured to form structured light.

Among the plurality of phase modulation regions, a width range of nanostructures included in a phase modulation region in which a gradient of a phase change in the first direction is a first gradient may be less than a width range of nanostructures included in a phase modulation region in which a gradient of a phase change in the first direction is a second gradient, the first gradient being greater than the second gradient.

Shapes and arrangement of nanostructures in each of the plurality of phase modulation regions may be set such that the meta optical device is configured to form a hologram pattern.

Among the plurality of phase modulation regions, a width range of nanostructures included in a phase modulation region in which a gradient of a phase change in the first direction is a first gradient may be less than a width range of nanostructures included in a phase modulation region in which a gradient of a phase change in the first direction is a second gradient, the first gradient being greater than the second gradient.

The preset wavelength band may include at least one of an infrared wavelength band and a visible light wavelength band.

The plurality of nanostructures may respectively have a shape dimension less than Ac that is a center wavelength of the preset wavelength band.

Heights of the plurality of nanostructures may be greater than $\lambda_o/2$ and less than $4\lambda_o$, where $\lambda_o$ is a center wavelength of the preset wavelength band.

According to another aspect of an example embodiment, there is provided an electronic apparatus including a meta optical device including a plurality of phase modulation regions respectively including a plurality of nanostructures that have shapes and arrangement based on a preset rule, the plurality of phase modulation regions being configured to modulate a phase of incident light of a preset wavelength band, wherein at least two phase modulation regions of the plurality of phase modulation regions have phase modulation ranges in a first direction that are same, and wherein the plurality of nanostructures included in the at least two phase modulation regions have width ranges in the first direction that are different from each other.

According to another aspect of an example embodiment, there is provided an meta optical device including a plurality of phase modulation regions respectively including a plurality of nanostructures that have shapes and arrangement based on a preset rule, the plurality of phase modulation regions being configured to modulate a phase of incident light of a preset wavelength band, wherein at least two regions of the plurality of phase modulation regions have phase modulation ranges in a first direction that are same, and wherein a width range of nanostructures included in each of the plurality of phase modulation regions decrease from a phase modulation region provided at a central portion of the meta optical device to a phase modulation region provided at a peripheral portion of the meta optical device.

BRIEF DESCRIPTION OF THE DRAWINGS

The above and other aspects, features, and advantages of example embodiments of the disclosure will be more apparent from the following description taken in conjunction with the accompanying drawings, in which.

DETAILED DESCRIPTION

Figure 1:
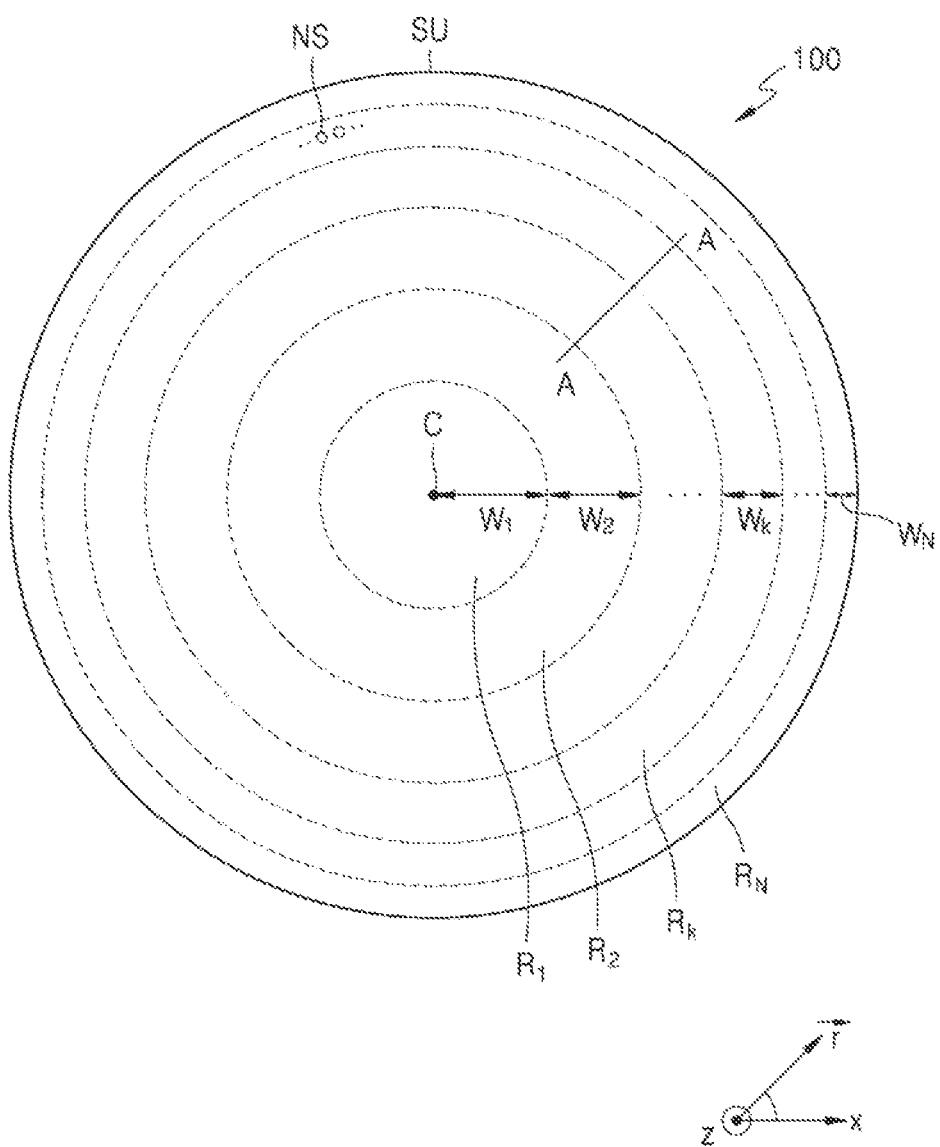
FIG. 1 is a plan view showing a schematic configuration of a meta optical device according to an example embodiment.

Reference will now be made in detail to example embodiments of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, example embodiments will be described in detail with reference to the accompanying drawings. The embodiments described below are merely exemplary, and various configurations that have been modified from these embodiments may be implemented. In the drawings, the same reference numerals refer to the same elements and the size of each component may be exaggerated for clarity and convenience of explanation.

When an element or layer is referred to as being "on" or "above" another element or layer, the element or layer may be directly on another element or layer or intervening elements or layers.

It will be understood that, although the terms "first," "second," etc. may be used herein to describe various elements, these terms are used only to differentiate an element from another element. These terms do not define the difference of materials or structures of the components.

The singular forms include the plural forms unless the context clearly indicates otherwise. In addition, it should be understood that, when a part "comprises" or "includes" an element in the specification, unless otherwise defined, it is not excluding other elements but may further include other elements.

Also, in the specification, the terms "unit", "module", or the like denotes a unit that processes at least one of function or operation, and the "unit", "module", or the like may be realized by hardware or software or a combination of hardware and software.

The term "the" and similar directional terms may be applied to both singular and plural.

With respect to operations that constitute a method, the operations may be performed in any appropriate sequence unless there is a clear statement that the operations should be done in the described sequence. All examples or example terms (for example, etc.) are simply used to explain in detail the technical concept, and thus, the scope of the inventive concept is not limited by the examples or the example terms as long as it is not defined by the claims.

Figure 2:
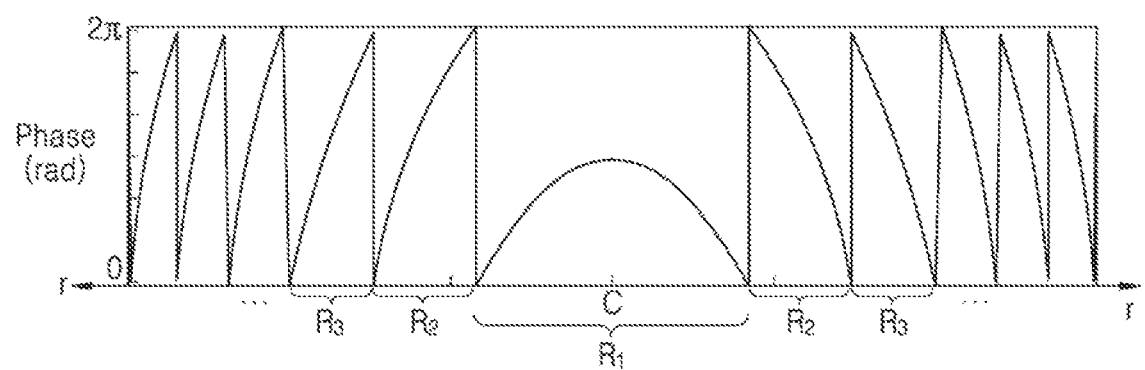
FIG. 2 is a graph showing an example of a phase profile of a meta optical device according to an example embodiment.
Figure 3:
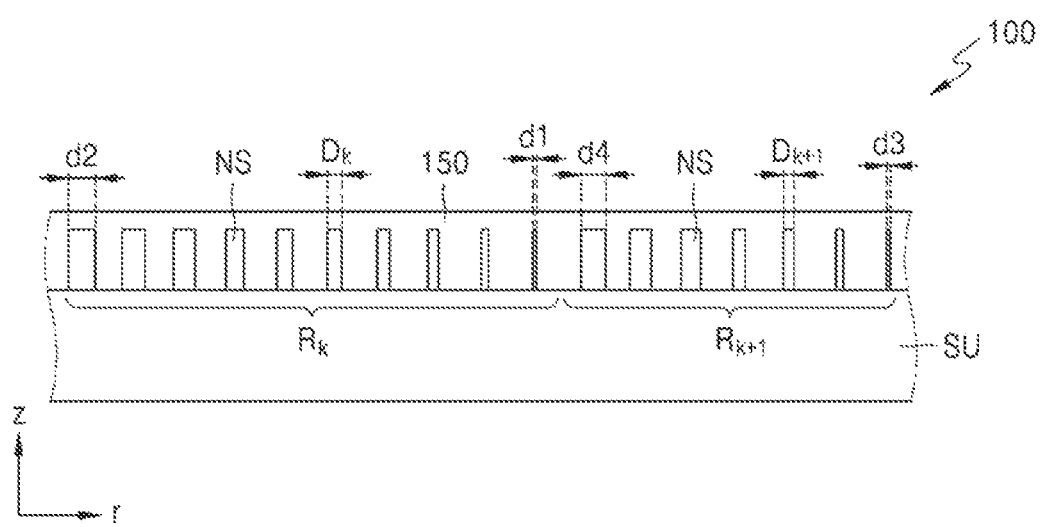
FIG. 3 is a cross-sectional view taken along line AA of FIG. 1 and shows in detail some regions of the meta optical device according to an example embodiment.

FIG. 1 is a plan view showing a schematic configuration of a meta optical device according to an example embodiment, FIG. 2 is a graph showing an example of a phase profile of a meta optical device according to an example embodiment, and FIG. 3 is a cross-sectional view taken along line AA of FIG. 1 and shows in detail some regions of the meta optical device according to an example embodiment.

A meta optical device 100 is configured to modulate a phase of incident light in a certain wavelength band, and incudes a plurality of nanostructures NS. The certain wavelength band may be a visible light band, a part of the visible light band, an infrared band, a part of the infrared band, or a band including all of the above-described bands. The plurality of nanostructure NS may be arranged on a substrate SU. For convenience, only a few nanostructures NS are exemplary shown in FIG. 1, and the number of the nanostructures NS shown in FIG. 3 is also exemplary. The nanostructures NS each have a shape dimension of a sub-wavelength less than a center wavelength $\lambda_0$ of the certain wavelength band, and have a refractive index different from a refractive index of the substrate SU and refractive indices of other surrounding materials. The meta optical device 100 may provide various phase profiles for the incident light according to the arrangement of the nanostructures NS.

The meta optical device 100 includes a plurality of phase modulation regions $R_k$ including a plurality of nanostructures NS whose shapes and arrangement are determined according to a preset rule. The plurality of phase modulation regions may be arranged along a certain direction defining a phase profile, and the certain direction may be a radial direction r away from the center C of the meta optical device 100, as shown in FIGS. 1 and 2, etc. However, embodiments are not limited thereto.

The rule set for each region of the meta optical device 100 is applied to parameters such as a shape, size (width, height), spacing, and arrangement of the nanostructures NS, and set according to a phase profile to be implemented by the entire meta optical device 100, for example, a phase profile illustrated in FIG. 2.

When light enters the meta optical device 100 in the Z-direction that is normal to the surface of the substrate SU and passes through the meta optical device 100, the light encounters a refractive index distribution according to the arrangement of the plurality of nanostructures NS having a refractive index different from the surrounding material. A position of the wavefront connecting points having the same phase in the path of light may be different before and after undergoing a refractive index distribution according to the arrangement of the nanostructures NS, which is expressed as a phase delay. The degree of the phase delay is different according to each position of the nanostructures NS on the substrate SU, which is a variable of the refractive index distribution. For example, the degree of the phase delay depends on a position (X and Y coordinates) on a plane perpendicular to the traveling direction (Z-direction) of light at a position immediately after light passes through the nanostructures NS of the meta optical device 100. When the arrangement of the nanostructures NS has polar symmetry or has rotational symmetry of a predetermined angle with respect to the Z-axis, the phase profile may be expressed as a function of the distance r from the center C of the substrate SU. This phase profile is expressed differently depending on the detailed shapes and an arrangement of the nanostructures NS constituting the meta optical device 100. The detailed shapes and an arrangement of the nanostructures NS to be set for each position according to the desired phase profile may be determined.

Hereinafter, expressions such as phase delay, phase modulation, and phase may be used interchangeably, and all of these expressions refer to a relative phase, at a position immediately after the light passes through the nanostructures NS, based on undergoing the refractive index distribution formed by the nanostructures NS.

A specific example of the arrangement of the nanostructures NS in the meta optical device 100 described below relates to a case where the meta optical device 100 functions as a lens, but embodiments are not limited thereto.

The plurality of phase modulation regions may include a first phase modulation region $R_1$, a second phase modulation region $R_2$, to an N-th phase modulation region $R_N$, etc. in a sequential order from the center C of the meta optical device 100 in the radial direction r, where N is an integer equal to or greater than 2. As shown in FIG. 1, the first phase modulation region $R_1$ may have a circular shape, and the second phase modulation region $R_2$ to N-th phase modulation region $R_N$ may each have an annular shape.

As shown in FIG. 2, the first phase modulation region $R_1$ to N-th phase modulation region $R_N$ are regions generating a predetermined range of phase delay, and the phase modulation ranges of the second phase modulation region $R_2$ to N-th phase modulation region $R_N$ may be the same. The phase modulation range may be $2\pi$ radians. The phase modulation range of the first phase modulation region $R_1$ may be less than $2\pi$ radians, but all of the phase modulation ranges may be referred to as $2\pi$ zones.

The function of each region, the number N or width $W_1, \ldots W_k, \ldots W_N$ of the regions may be major variables affecting the performance of the meta optical device 100.

In order that the meta optical device 100 functions as a lens, the width of each region $R_k$ may be set to be nonuniform. For example, the width of each region $R_k$ may be set to decrease from the center C to the peripheral portion. In addition, a rule in each region $R_k$ may be set such that a direction in which the incident light is diffracted in each region $R_k$ is slightly different, that is, the deflection angle of the incident light when the incident light passes through each region $R_k$ is slightly different. The number and the distribution of the width of the regions $R_k$ is related to an absolute value of the magnitude of a maximum refractive power of the meta optical device 100, and the sign of the refractive power may be determined according to the rule in each region $R_k$. For example, the larger the maximum refractive power, the narrower the regions $R_k$ can be. In each region R, a positive refractive power may be provided by an arrangement according to a rule in which the size of the nanostructures NS decreases along the radial direction (an arrangement in which the phase decreases), and a negative refractive power may be provided by an arrangement according to a rule in which the size of the nanostructures NS increases along the radial direction (an arrangement in which the phase increases). The phase profile and the shape distribution of the nanostructures NS shown in FIGS. 2 and 3, respectively, are illustrated in the form of a lens having the positive refractive power, however, embodiments are not limited thereto. For example, the meta optical device 100 may be modified to have a phase profile providing the negative refractive power and nanostructures NS having a shape distribution to provide a negative refractive power.

Referring to FIG. 3, the meta optical device 100 includes a substrate SU and nanostructures NS arranged on the substrate SU. In addition, the meta optical device 100 may further include a peripheral material layer 150 covering the nanostructures NS.

The substrate SU has a property of being transparent for light of an operating wavelength band of the meta optical device 100, and may include one of glass (fused silica, BK7, etc.), quartz, polymer (PMMA, SU-8, etc.), and other transparent plastic materials.

The nanostructure NS includes a material having a refractive index that is different from a refractive indices of surrounding materials such as peripheral material layer 150 and substrate SU. For example, the refractive index of the nanostructure NS may be greater than that of surrounding material by 0.5 or more, or the refractive index of the nanostructure NS may be less than that of surrounding material by 0.5 or more.

When the nanostructures NS include a material having a refractive index higher than that of the surrounding material, the nanostructures NS may include at least one of crystalline silicon (c-Si), p-Si, a-Si, Group III-V compound semiconductors (gallium arsenide (GaAs), gallium phosphide (GaP), gallium nitride (GaN), etc.), silicon carbide (SiC), titanium oxide ($TiO_2$), and silicon nitride (SiN), and the surrounding material having a low refractive index may include a polymer material such as SU-8 and PMMA, silicon oxide ($SiO_2$), or SOG.

When the nanostructures NS include a material having a refractive index lower than that of the surrounding material the nanostructure NS may include $SiO_2$ or air, and the surrounding material having a high refractive index may include at least one of c-Si, p-Si, a-Si, Group III-V compound semiconductors (GaAs, GaP, GaN, etc.), SiC, $TiO_2$, and SiN.

In FIG. 3, two regions $R_k$ and $R_{k+1}$ adjacent to each other are shown, and the two regions $R_k$ and $R_{k+1}$ generate the same phase modulation range. Since the two regions $R_k$ and $R_{k+1}$ have different widths in the radial direction r, the gradients of a phase change in the radial direction in the two regions $R_k$ and $R_{k+1}$ are different from each other, and the incident light is diffracted at different angles in the two regions $R_k$ and $R_{k+1}$. In an example embodiment, the width ranges of the nanostructures NS arranged in the two regions $R_k$ and $R_{k+1}$) are different from each other. For example, widths $D_k$ and $D_{k+1}$ of the nanostructures NS may be arbitrary widths of the nanostructures NS in a cross section perpendicular to the height direction (Z-direction). For example, when the nanostructures NS have a circular cross section, the radius range may vary depending on the regions. When the nanostructures NS have a rectangular cross section, a range of lengths in width direction and a direction perpendicular to the width direction may vary depending on the regions. The widths $D_k$ and $D_{k+1}$ of the nanostructures NS may include a width in a radial direction and a width in a circumferential direction. In the two regions $R_k$ and $R_{k+1}$, the incident light is modulated in a phase modulation range of about $2\pi$ radians in the radial direction r, and in this case, the widths $D_k$ and $D_{k+1}$ of the nanostructures NS also vary as the position in the radial direction r changes.

Referring to FIG. 3, the width range of the nanostructures NS in each of the two regions $R_k$ and $R_{k+1}$ decrease in the radial direction. A width range $\Delta D_k$, which is a range of width $D_k$ of the nanostructures NS in the region $R_k$, is different from a width range $\Delta D_{k+1}$, which is a range of width $D_{k+1}$ of the nanostructures NS in the region $R_{k+1}$. $\Delta D_k$ may be in the range of d1 to d2, $\Delta D_{k+1}$ may be in the range of d3 to d4, and values of |d2−d1| and |d4−d3| may be different from each other. In the two regions $R_k$ and $R_{k+1}$, refraction angle of the incident light differ from each other, and a region, of the two regions $R_k$ and $R_{k+1}$, in which the refraction angle of the incident light is greater may have a narrower width distribution. That is, the width range $\Delta D_{k+1}$ in the region located at a peripheral portion may be less than the width range $\Delta D_k$ in the region $R_k$ located at a relatively central portion.

In this way, designing the shape of the nanostructures NS in consideration of not only the phase modulation value by the nanostructures NS, but also the phase derivative according to the position, may increase the efficiency of the optical performance of the meta optical device 100. When a part of the light passing through the meta optical device 100 diffracts in a direction other than the desired diffraction direction, the optical performance is degraded. Therefore, in order to further increase the diffraction efficiency, the phase derivative is considered when the shape of the nanostructures NS is set. This will be described with reference to FIGS. 4 to 7.

Figure 4:
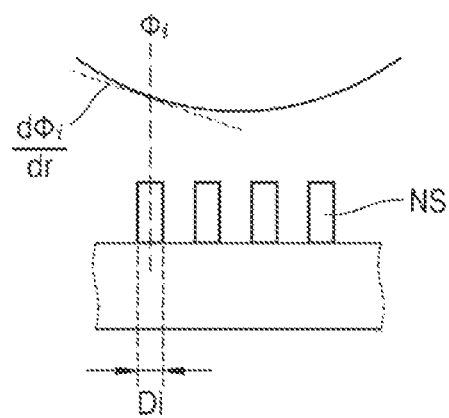
FIG. 4 conceptually shows that a phase and a phase gradient are defined for each position according to a shape distribution of a plurality of nanostructures included in a meta optical device.
Figure 5:
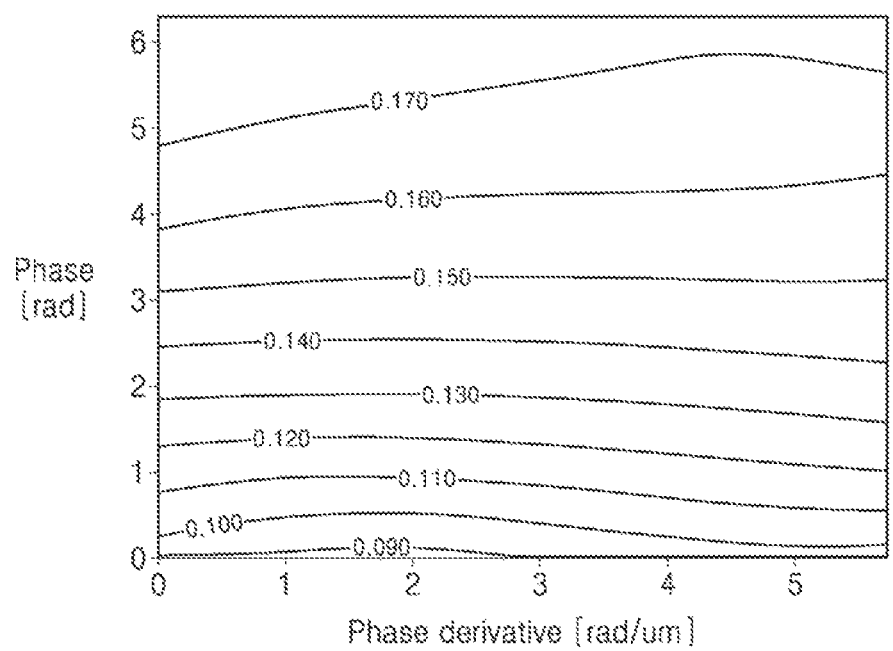
FIG. 5 is a distribution diagram showing an example of a relationship between a phase derivative, a phase, and a width of nanostructures by computer simulation.

FIG. 4 conceptually shows that a phase and a phase gradient are defined for each position according to a shape distribution of a plurality of nanostructures included in a meta optical device. FIG. 5 is a distribution diagram showing an example of a relationship between a phase derivative, a phase and a width of nanostructures by computer simulation.

As shown in FIG. 4, a phase $\varphi_i$ and a phase derivative $d\varphi/dr$ in a local region of the meta optical device 100 are related to the width $D_i$ of the nanostructures NS located in the local region. When the width of the nanostructures NS in the corresponding position is set, in case that phase $\varphi i$ and the phase derivative $d\varphi i/dr$ required at the position i are considered together, an optimal design value, as possible, in terms of the viewpoint of the intended optical performance may be derived.

In the distribution diagram of FIG. 5, the horizontal direction represents the phase derivative, the vertical direction represents the phase, and the widths of the nanostructures NS are numerically displayed as contour lines in an area mapped with the phase derivative value and the phase value. The unit of the width is um. From this distribution diagram, when the phase derivative value and the phase value are determined, widths of the nanostructures NS corresponding to the values may be set. As shown in the distribution diagram of FIG. 5, spacing between the contour lines representing the value of the widths of nanostructures NS exhibits a tendency to increase as the phase derivative increases. For example, to implement the same range of phase values, it can be seen that in the case where the phase derivative value is large compared to the case where the phase derivative value is small, a range of the width design variable can be narrowed.

The design of the meta optical device considering the phase derivative value is different from a related design in which when the width of the nanostructure is set, only the phase value at the position where the nanostructure is placed is considered Since the phase derivative is a major factor in determining the angle of diffraction of the incident light, the optical performance with a higher precision and a higher efficiency can be achieved by setting the width of the nanostructure according to the example embodiment.

Figure 6:
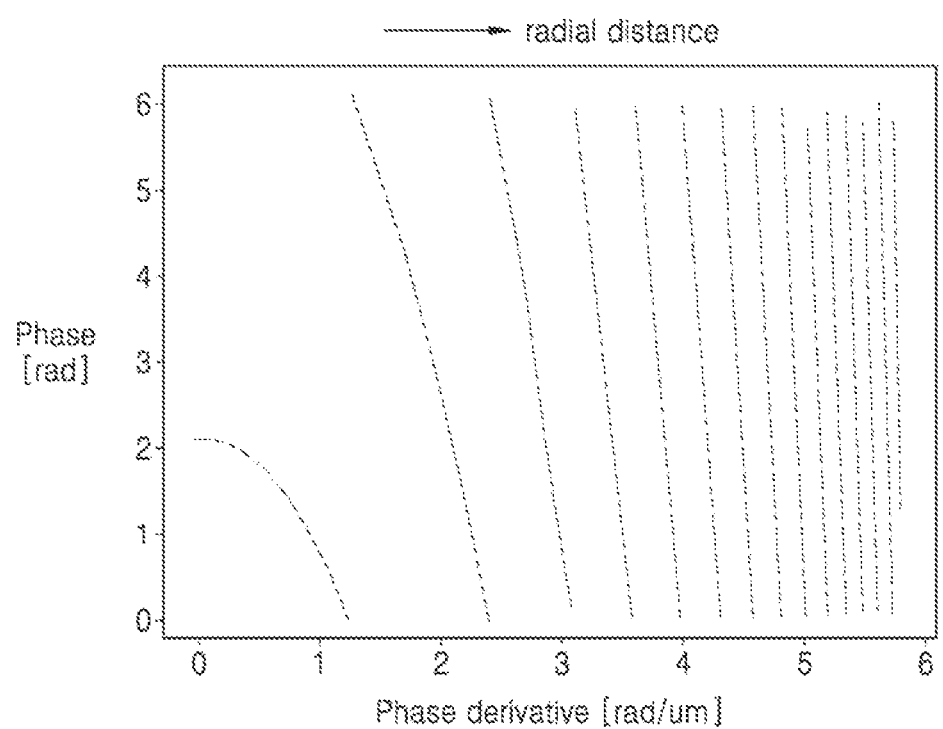
FIG. 6 is a graph obtained by extracting a relationship between a phase and a phase derivative from the phase profile of FIG. 5.
Figure 7:
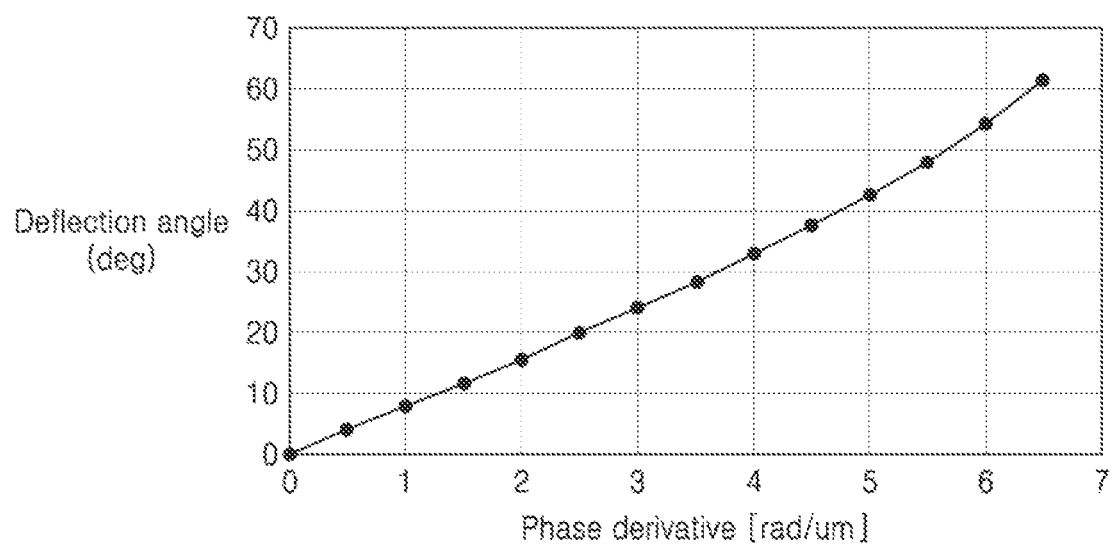
FIG. 7 is a graph showing a relationship between a phase derivative and a deflection angle.

FIG. 6 is a graph obtained by extracting the relationship between a phase and a phase derivative from the phase profile of FIG. 2. FIG. 7 is a graph showing the relationship between the phase derivative and the deflection angle when the wavelength of incident light is 850 nm.

As shown in FIG. 2, the phase profile to be implemented by the meta optical device includes a deflection angle which is to be implemented for each position for incident light. For example, the deflection angle for the incident light to be implemented for each position by the meta optical device may be set, and the phase and phase derivative for each position may be set in consideration of the relationship between the phase derivative and the deflection angle as shown in FIG. 7. The relationship between the phase derivative and the deflection angle may be expressed by a graph as shown in FIG. 6, and the width of the nanostructure NS required at each radial distance may be set with reference to the distribution diagram as shown in FIG. 5.

Figure 8:
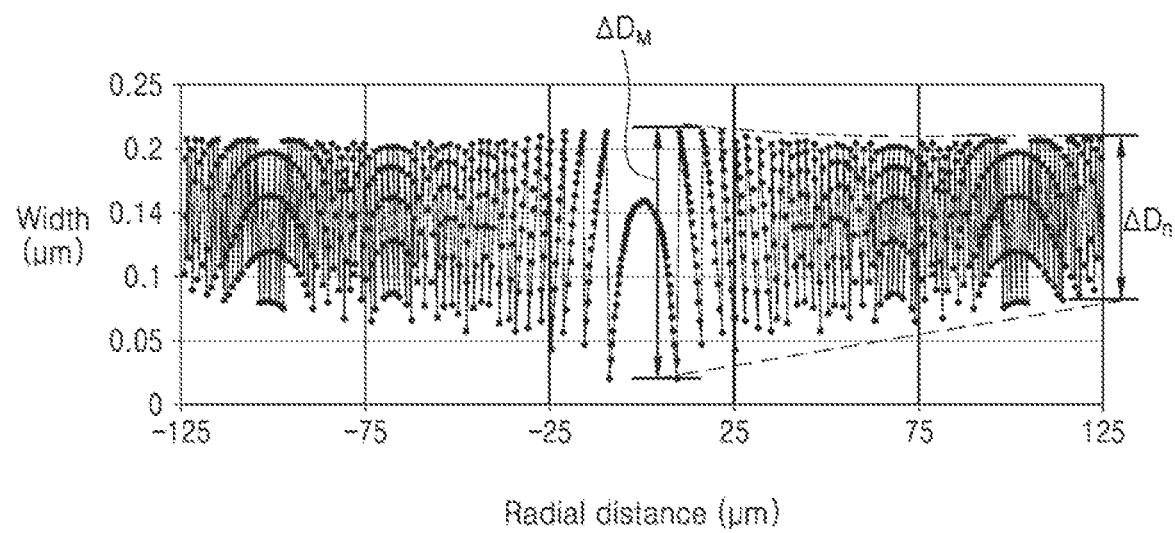
FIG. 8 is a distribution diagram showing widths of nanostructures included in a meta optical device according to an example embodiment according to positions.

FIG. 8 is a distribution diagram showing widths of nanostructures included in a meta optical device according to an example embodiment according to positions of the nanostructures.

The distribution diagram of FIG. 8 is for a width distribution of nanostructures that generates a phase profile similar to that of FIG. 2, and represents a case where the phase at the center does not correspond to $2\pi$. Compared to the example embodiment in FIG. 2, the $2\pi$ zone regions are repeated much more frequently. The width range may be set such that a first range, which is the width range ($\Delta D_M$) from the central portion to the second phase modulation region, has a value larger than a second range, which is the width range ($\Delta D_n$) of the region located at the most peripheral region. The first range and the second range are the maximum range and the minimum range for the nanostructure width range shown in the plurality of phase modulation regions, respectively. The first range may be about 1.6 times the second range. However, this is exemplary and the first range may be about 1.2 times to about 1.6 times the second range. A ratio of the first range to the second range is can be set in consideration of a difference between the phase derivatives (deflection angles) in regions, among the phase modulation regions included in the meta optical device, at which the phase derivatives are the largest and the smallest, respectively. The ratio of the first range to the second range may increase as the deflection angle range in the meta optical device increases.

When the first range is a1 to a2 and the second range is a3 to a4, the first range and the second range may be set such that a1<a3 and a2>a4, as shown in FIG. 8. However, embodiments are not limited thereto. For example, the first and second ranges may be set such that the minimum values in the respective ranges are the same while the maximum values are not the same, or the maximum values in the respective ranges are the same while the minimum values are not the same.

Figure 9:
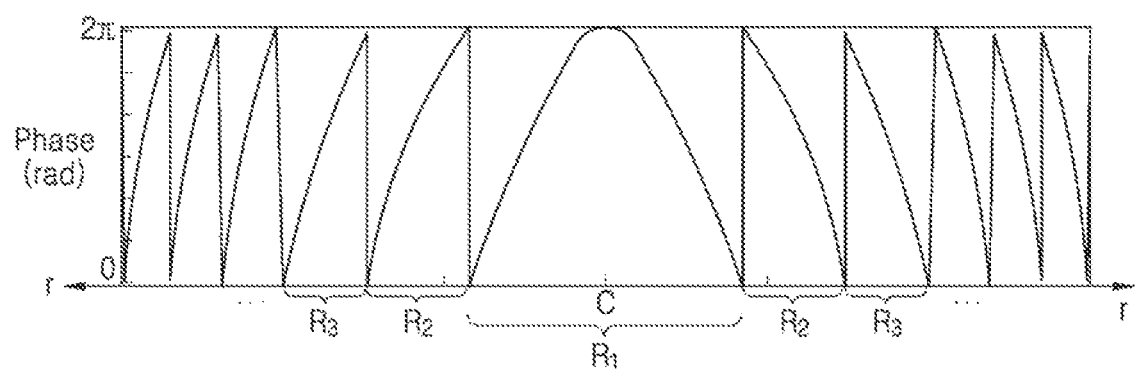
FIG. 9 is a graph showing an example of a phase profile of a meta optical device according to another example embodiment.
Figure 10:
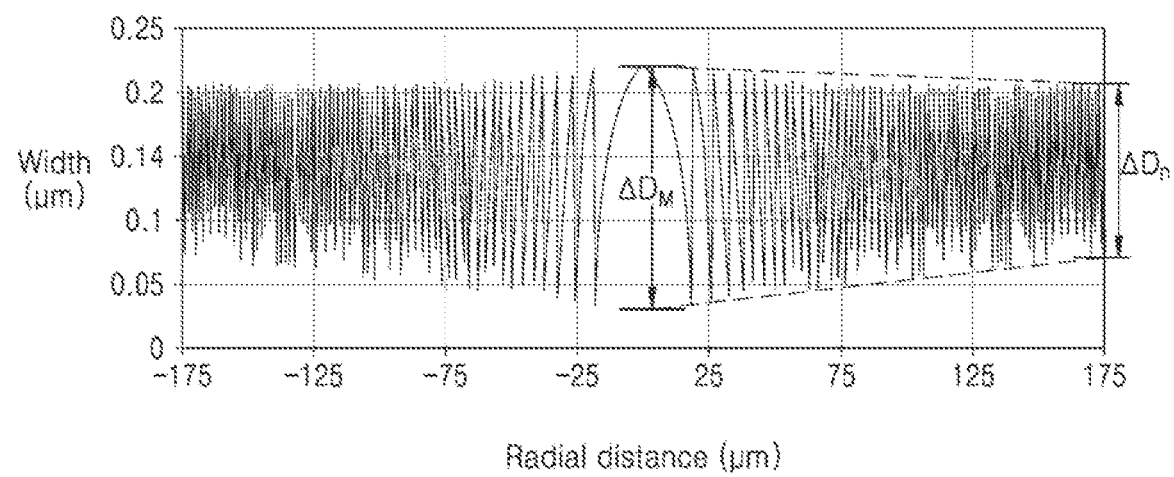
FIG. 10 is a distribution diagram showing widths of nanostructures showing the phase profile of FIG. 9 according to positions.

FIG. 9 is a graph showing an example of a phase profile of a meta optical device according to another example embodiment, and FIG. 10 is a distribution diagram showing the widths of nanostructures showing a phase profile similar to that of FIG. 9 according to positions of the nanostructures.

As shown in FIG. 9, the phase modulation range of the meta optical device differs from the phase profile of FIG. 2 in that the phase modulation range of the most central region is also set to $2\pi$ similar to other regions. In FIG. 10, the $2\pi$ zones are repeated much more frequently than that shown in FIG. 9.

In consideration of the phase profile and the phase derivative extracted from the phase profile, the widths of the nanostructures of each region may be set as shown in FIG. 10. In FIG. 10, the central region may represent a first range, which is the widest width range ($\Delta D_M$), and the peripheral region may represent a second range, which is the narrowest width range ($\Delta D_n$). The first range may be about 1.45 times the second range. However, this is exemplary and the first range may be set to be about 1.2 times to about 1.6 times the second range, and values of specific widths satisfying this range may be set. The ratio of the first range to the second range may increase as the deflection angle range (range of tie phase derivative change) in the meta optical device increases.

FIGS. 11A to 11D show examples of shapes of nanostructures that may be included in a meta optical device according to example embodiments.

Figure 11A:
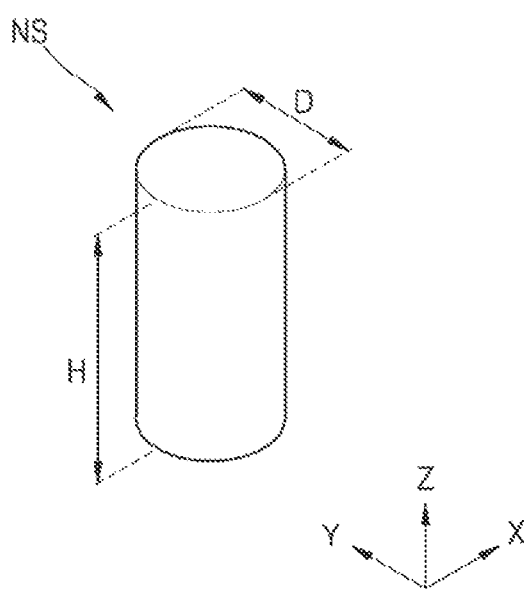
FIGS. 11A, 11B, 11C, and 11D show examples of shapes of nanostructures that may be included in a meta optical device according to example embodiments.

The nanostructure NS may be a pillar structure. For example, the nanostructure NS may be a cylindrical shape having a diameter D and a height H as shown in FIG. 11A. The nanostructure NS may include a material of a higher refractive index than its surroundings. For example, the nanostructure NS may include at least one of c-Si, p-Si, a-Si, Group III-V compound semiconductors (GaP, GaN, GaAs, etc.), SiC, TiO$_2$, and SiN, and the surroundings may be filled with a material of a lower refractive index, for example, air, SiO$_2$, or a polymer material such as SU-8 and PMMA. The diameter D of the nanostructure NS is a sub-wavelength that is less than a center wavelength $\lambda_0$ of an operating wavelength band, and the height H of the nanostructure NS may be greater than a center wavelength $\lambda_0$ of an operating wavelength band. For example, the height H may be larger than $\lambda_0/3$ and less than $4\lambda_0$.

Figure 11B:
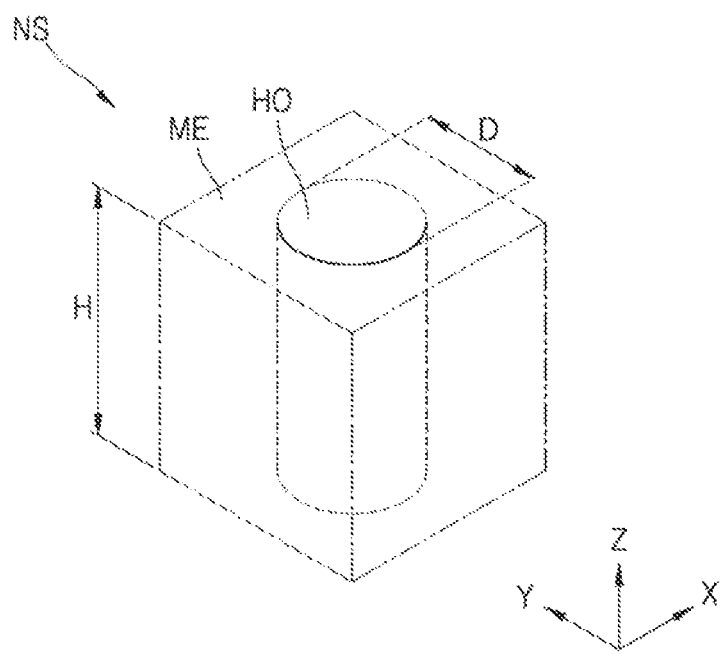

Referring to FIG. 11B, the nanostructure NS may be in the form of a hole HO having a cylindrical shape which is formed by being engraved on a medium layer ME of a predetermined refractive index. The inside of the hole HO may be empty, that is, may be filled with air, or may be filled with a material having a refractive index lower than that of the medium layer ME. The medium layer ME may include a material comprising at least one of c-Si, p-Si, a-Si, Group III-V compound semiconductors (GaP, GaN, GaAs, etc.), SiC, TiO$_2$, and SiN, and the inside of the hole HO may be filled with air, SiO$_2$, or a polymer material such as SU-8 and PMMA.

Figure 11C:
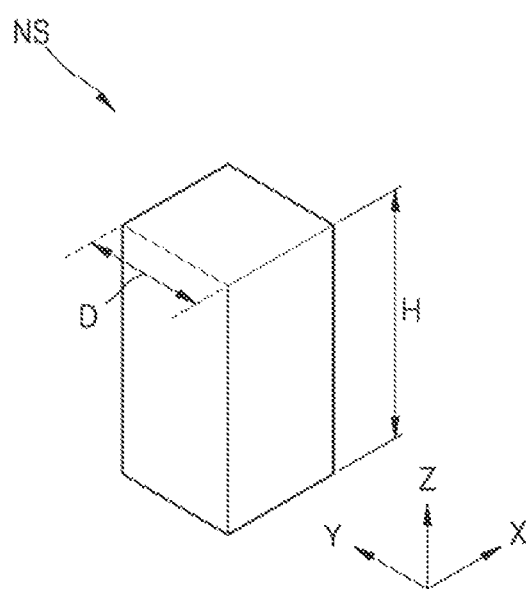
Figure 11D:
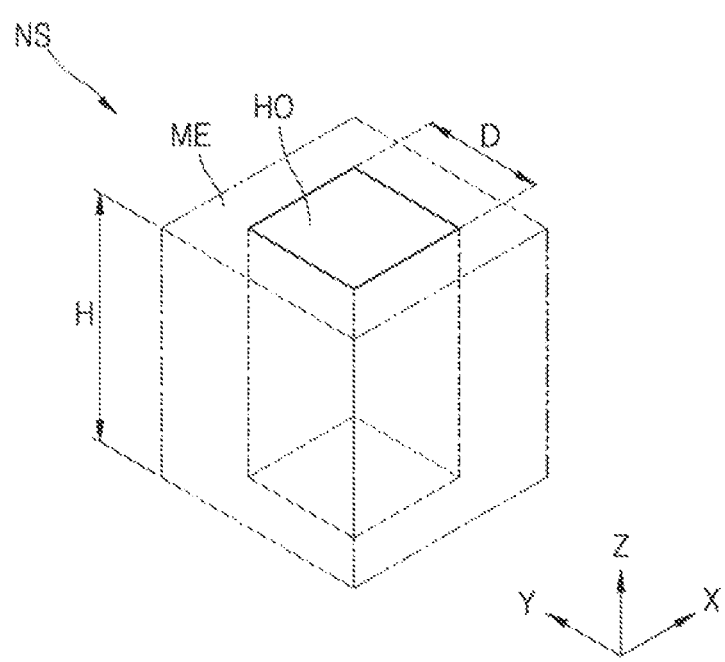

Referring to FIG. 11C, the nanostructure NS may have a square pillar shape having a side length D and a height H, or, as shown in FIG. 11D, may have a shape in which a hole HO of a square pillar shape is engraved on a medium layer ME.

In addition to the above-illustrated shapes, the nanostructure NS may have various pillar shapes having a rectangular, cross-shaped, polygonal, or elliptical cross section, or may have a shape in which hole of the above-described pillar shape is engraved on a medium layer.

In the above-described meta optical device according to example embodiments, the division of the region and the arrangement of the nanostructures in each region have been described by exemplifying a lens function having a refractive power of the same sign in the entire region, but embodiments are not limited thereto.

In a meta optical device of another example embodiment, shapes and an arrangement of the nanostructures of each of region may be set such that an angle of refraction of the incident light changes non-linearly. This meta optical device may exhibit a tendency in which the change in an angle of refraction of the incident light is not constant in the radial direction, and similar to an aspherical lens, may exhibit a tendency in which the angle changes variously. Accordingly, the sign of the refractive power may not be constant and may change in the radial direction. As described above, when the width of each nanostructure of a plurality of phase modulation regions is a determined, first range, which is a width range of the nanostructures included in a region in which the incident light is refracted at a relatively small angle, may be set to be greater than a second range, which is a width range of the nanostructures included in a region in which the incident light is refracted at a relatively large angle. According to the above-described nanostructure shape design, the desired features of an aspherical lens may be more efficiently obtained.

As described above, when the first range and the second range are set differently, an efficiency improvement may be increased when the range of change in the deflection angle by the meta optical device is relatively wide. That is, the efficiency improvement by the above-described range setting may be increased as the difference in the angles of refraction of the incident light by the peripheral portion and the central portion is increased. The meta optical device may be, for example, a lens having a field of view of about 20 degrees to about 170 degrees.

A meta optical device according to another example embodiment may provide an output phase distribution for each position suitable for optical functions other than a lens. For example, a shape of a plurality of phase modulation regions and nanostructures in each region may be set to form an output phase distribution in a free form or an output phase distribution providing a structured light or a holographic image.

Figure 12:
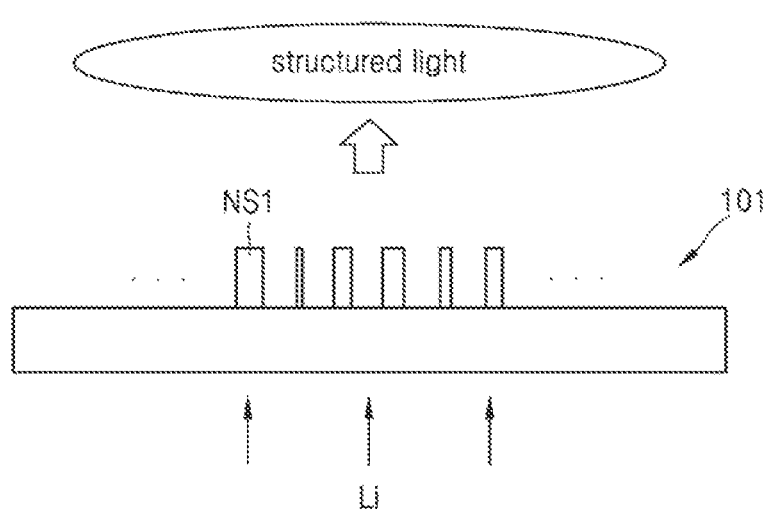
FIG. 12 conceptually shows an optical function of a meta optical device according to another example embodiment.

FIG. 12 conceptually shows an optical function of a meta optical device according to another example embodiment.

After the incident light Li passes through the meta optical element 101, structured light having certain rays of light distribution may be formed. The structured fight has a distribution of light and dark beam spots in a certain pattern, and this pattern may be mathematically coded such that the bright and dark spots each uniquely designate an angular positional coordinate. The structured light may be used to acquire three-dimensional information about a subject. For example, after the structured light is radiated on the subject, 3D information of the subject OBJ may be extracted by analyzing a pattern change when the structured light is reflected from the subject.

Figure 13:
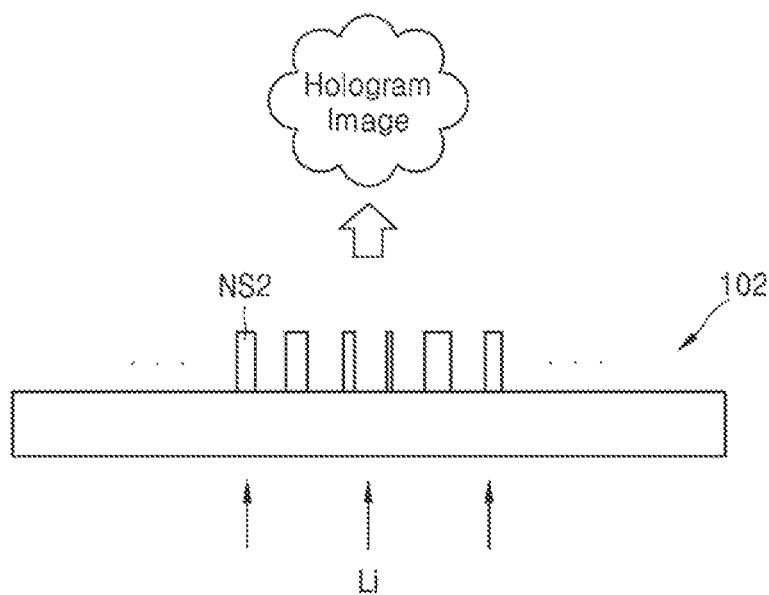
FIG. 13 conceptually shows an optical function of a meta optical device according to another example embodiment.

FIG. 13 conceptually shows an optical function of a meta optical device according to another example embodiment.

The shapes and arrangement of the nanostructures NS2 may be set such that a meta optical device 102 forms s hologram pattern that displays a hologram image. The shapes and arrangement of the nanostructures NS2 may be set to form a phase distribution corresponding to the hologram pattern capable of displaying a predetermined holographic image. The hologram pattern may be an interference pattern obtained by interfering with a predetermined reference beam and an object beam reflected from an original object. When the same incident light Li as the reference light is radiated onto the meta optical device 102 providing the phase distribution corresponding to the hologram pattern, the image of the original object may be reconstructed as a hologram image.

The meta optical devices 101 and 102 may be the meta optical device 100 of FIG. 1 such that the meta optical devices 101 and 102 each may include a plurality of phase modulation regions including a plurality of nanostructures NS1 and NS2 whose shapes and arrangement are determined according to a preset rule and modulate the phase of incident light of a certain wavelength band. The meta optical devices 101 and 102 may differ from the meta optical device 100 only in details of a specific phase profile. For example, at least two regions included in the meta optical devices 101 and 102 may have the same phase modulation range in a certain first direction, and the nanostructures included in these at least two regions may have different width ranges in the first direction. These at least two regions may be regions in which gradients of a phase change in the first direction are different from each other, and a region in which the gradient of the phase change is larger may have a narrower width distribution By applying this concept, the shape distributions of the nanostructures NS1 and NS2 may be designed to generate an output phase distribution corresponding to a structured light coded with predetermined positional coordinates or a hologram pattern containing predetermined image information, and the efficiency in realizing the intended optical function may be improved.

The meta optical devices 101 and 102 are illustrated to operate as a transmissive type, but are not limited thereto, and may have a configuration that operates as a reflective type.

The above-described meta optical devices may be applied to various electronic apparatuses. For example, the above-described meta optical devices may be mounted on electronic apparatuses such as smartphones, wearable devices, augmented reality (AR) and virtual (VR) devices, Internet of Things (IoT) devices, home appliances, tablet personal computers (PCs), personal digital assistants (PDA), portable multimedia players (PMP), navigation, drones, robots, driverless vehicles, autonomous vehicles, and advanced driver assistance systems (ADAS).

Figure 14:
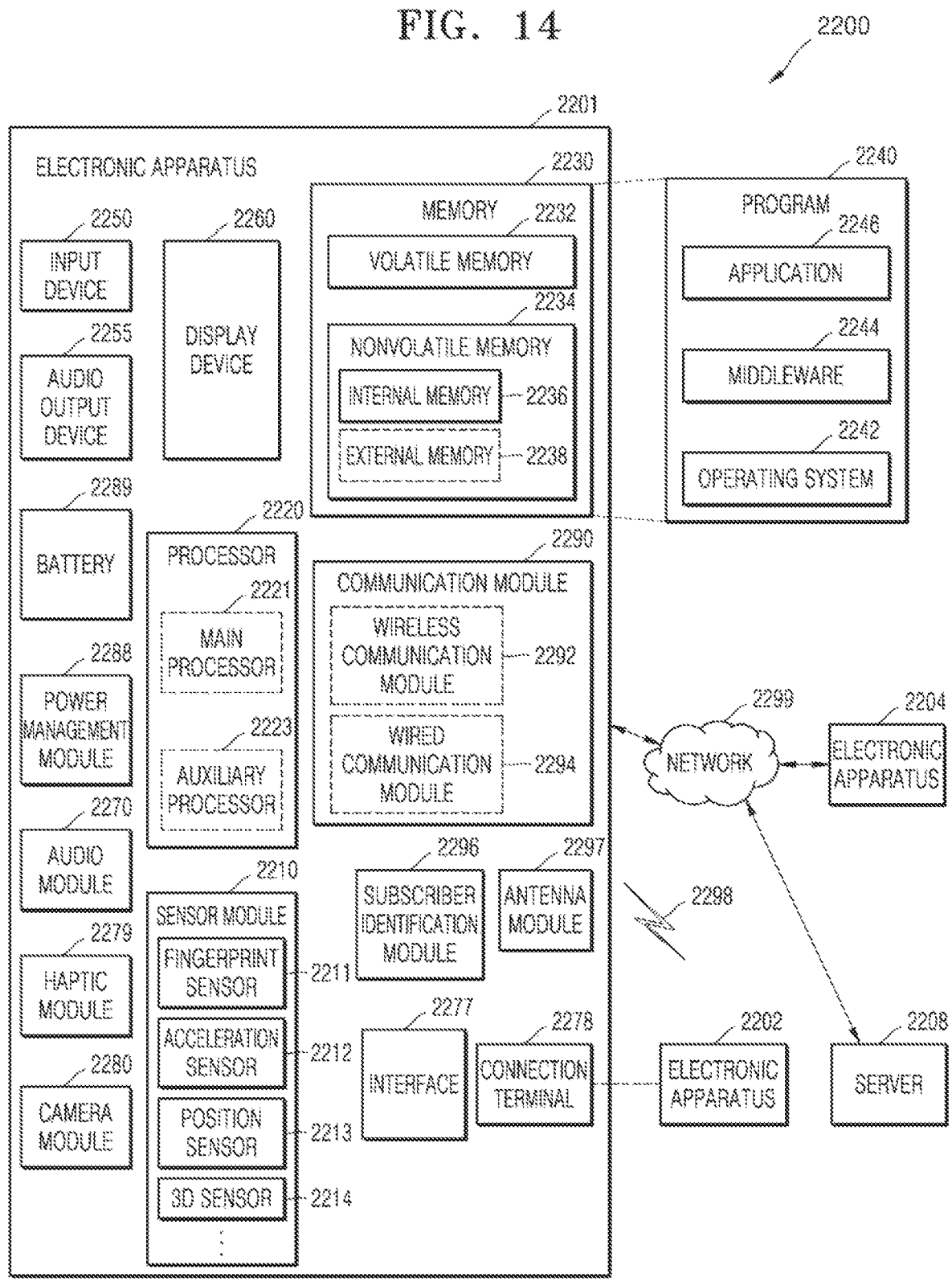
FIG. 14 is a block diagram showing a schematic configuration of an electronic apparatus according to an example embodiment.

FIG. 14 is a block diagram showing a schematic configuration of an electronic apparatus according to an example embodiment.

Referring to FIG. 14, in a network environment 2200, an electronic apparatus 2201 may communicate with another electronic apparatus 2202 through a first network 2298 (short-range wireless communication network, etc.), or may communicate with another electronic apparatus 2204 and/or a server 2208 through a second network 2299 (telecommunications network, etc.). The electronic apparatus 2201 may communicate with the electronic apparatus 2204 through the server 2208. The electronic apparatus 2201 may include a processor 2220, a memory 2230, an input device 2250, an audio output device 2255, a display device 2260, an audio module 2270, a sensor module 2210, an interface 2277, a haptic module 2279, a camera module 2280, a power management module 2288, a battery 2289, a communication module 2290, a subscriber identification module 2296, and/or an antenna module 2297. In the electronic apparatus 2201, some components (the display device 2260, etc.) of the above-described components may be omitted, or other components may be added Some ox the above-described components may be implemented in one integrated circuit. For example, a fingerprint sensor 2211 of the sensor module 2210, or an iris sensor, an illuminance sensor, etc. may be implemented by being embedded in the display device 2260 (a display, etc.).

The processor 2220 may execute software (a program 2240, etc.) to control one or more other components (hardware or software components, etc.) of the electronic apparatus 2201 connected to the processor 2220, and may perform a variety of data processing or operations. As a portion of the data processing or operations, the processor 2220 may load instructions and/or data received from other components (the sensor module 2210, the communication module 2290, etc.) into a volatile memory 2232, may process instructions and/or data stored in the volatile memory 2232, and may store result data in a nonvolatile memory 2234 including an internal memory 2236 and an external memory 2238. The processor 2220 may include a main processor 2221 (a central processing unit, an application processor, etc.) and an auxiliary processor 2223 (a graphics processing unit, an image signal processor, a sensor hub processor, a communication processor, etc.) that may be operated independently or together. The auxiliary processor 2223 uses less power than the main processor 2221 and may perform specialized functions.

The auxiliary processor 2223 may control functions and/or states related to some (the display device 2260, the sensor module 2210, the communication module 2290, etc.) of the components of the electronic apparatus 2201 on behalf of the main processor 2221 while the main processor 2221 is in an inactive sate (e.g., sleep state) or with the main processor 2221 while the main processor 2221 is in an active state (e.g., application execution state). The auxiliary processor 2223 (an image signal processor, a communication processor, etc.) may be implemented as a portion of other functionally relevant components (the camera module 2280, the communication module 2290, etc.).

The memory 2230 may store a variety of data required by components (the processor 2220, the sensor module 2276, etc.) of the electronic apparatus 2201. The data may include, for example, software (the program 2240, etc.) and input data and/or output data for instructions related the software. The memory 2230 may include the volatile memory 2232 and/or the nonvolatile memory 2234.

The program 2240 may be stored as software in the memory 2230, and may include an operating system 2242, middleware 2244, and/or an application 2246.

The input device 2250 may receive instructions and/or data to be used for the components (the processor 2220, etc.) of the electronic apparatus 2201 from the outside (a user, etc.) of the electronic apparatus 2201. The input device 2250 may include a microphone, mouse, keyboard, and/or digital pen (a stylus pen, etc.).

The audio output device 2255 may output an audio signal to the outside of the electronic apparatus 2201. The audio output device 2255 may include a speaker and/or a receiver. The speaker may be used for general purposes such as multimedia playback or recording playback, and the receiver may be used to receive incoming calls. The receiver may be combined as a portion of the speaker or may be implemented as a separate device.

The display device 2260 may visually provide information to the outside of the electronic apparatus 2201. The display device 2260 may include a display, a hologram device, or a projector, and a control circuit for controlling these devices. The display device 2260 may include a touch circuitry set to sense a touch, and/or a sensor circuit (a pressure sensor, etc.) configured to measure the magnitude of force generated by the touch.

The audio module 2270 may convert sound into an electrical signal, or vice versa. The audio module 2270 may obtain sound through the input device 2250, or may output sound through the audio output device 2255 and/or speakers and/or headphones of another electronic apparatus (an electronic apparatus 2202, etc.) directly or wirelessly connected to the electronic apparatus 2201.

The sensor module 2210 may detect an operating state (power, temperature, etc.) of the electronic apparatus 2201 or an external environmental state (user status, etc.), and may generate an electrical signal and/or a data value corresponding to the detected state. The sensor module 2210 may include the fingerprint sensor 2211, an acceleration sensor 2212, a position sensor 2213, a 3D sensor 2214, etc., and may further include an iris sensor, a gyro sensor, an air pressure sensor, a magnetic sensor, a grip sensor, a proximity sensor, a color sensor, an infrared (IR) sensor, a biometric sensor, a temperature sensor, a humidity sensor, and/or an illuminance sensor.

The 3D sensor 2214 senses a shape and movement of a subject by irradiating certain light onto the subject and analyzing light reflected by the subject, and may include the meta optical device 101 of FIG. 12 utilizing the meta optical device 100 described with reference to FIGS. 1 to 11D.

The interface 2277 may support one or more designated protocols, which may be used to directly or wirelessly connect the electronic apparatus 2201 with other electronic apparatuses (the electronic apparatus 2202, etc.). The interface 2277 may include a high definition multimedia interface (HDMI), a universal serial bus (USB) interface, a secure digital (SD) card interface, and/or an audio interface.

A connection terminal 2278 may include a connector through which the electronic apparatus 2201 may be physically connected to other electronic apparatuses (the electronic apparatus 2202, etc.). The connection terminal 2278 may include an HDMI connector, a USB connector, an SD card connector, and/or an audio connector (a headphone connector, etc.).

The haptic module 2279 may convert electrical signals into a mechanical stimulus (vibration, movement, etc.) or an electrical stimulus that the user may perceive through tactile or motor sensations. The haptic module 2279 may include a motor, a piezoelectric element, and/or an electrical stimulation device.

The camera module 2280 may capture a still image and a moving image. The camera module 2280 may include a lens assembly including one or more lenses, image sensors, image signal processors, and/or flashes. The lens assembly included in the camera module 2280 may collect light emitted from the subject to be image captured, and the lens assembly may include any one of the meta optical devices 100 described with reference to FIGS. 1 to 11D.

The power management module 2288 may manage power supplied to the electronic apparatus 2201. The power management module 388 may be implemented as a portion of a power management integrated circuit PMIC.

The battery 2289 may supply power to components of the electronic apparatus 2201. The battery 2289 may include a non-rechargeable primary battery, a rechargeable secondary battery, and/or a fuel cell.

The communication module 2290 may support establishment of a direct (wired) communication channel and/or a wireless communication channel between the electronic apparatus 2201 and other electronic apparatuses (the electronic apparatus 2202, the electronic apparatus 2204, the server 2208, etc.), and communication through the established communication channel. The communication module 2290 may include one or more communication processors that operates independently of the processor 2220 (an application processor, etc.) and supports direct communication and/or wireless communication. The communication module 2290 may include a wireless communication module 2292 (a cellular communication module, a short-range wireless communication module, a global navigation satellite system (GNSS), etc.) and/or a wired communication module 2294 (a local area network (LAN) communication module, a power line communication module, etc.) The corresponding communication module among these communication modules may communicate with other electronic apparatuses through the first network 2298 (a local area network such as Bluetooth, WiFi Direct, or Infrared Data Association (IrDA)) or the second network 2299 (a telecommunication network such as a cellular network, the Internet, or computer networks (LAN, WAN, etc.)) These various types of communication modules may be integrated into a single component (a single chip, etc.) or may be implemented as a plurality of separate components (multiple chips). The wireless communication module 2292 may identify and authenticate the electronic apparatus 2201 within a communication network such as the first network 2298 and/or the second network 2299 using subscriber information (an international mobile subscriber identifier (IMSI), etc.) stored in the subscriber identity module 2296.

The antenna module 2297 may transmit and/or receive signals and/or power to and/or from the outside (other electronic apparatuses, etc.). An antenna may include a radiator made of a conductive pattern formed on a substrate (PCB, etc.). The antenna module 2297 may include one or more antennas. When a plurality of antenna are included, the communication module 2290 may select an antenna suitable for a communication scheme used in a communication network, such as the first network 2298 and/or the second network 2299, from among the plurality of antennas. Signals and/or power may be transmitted or received between the communication module 2290 and other electronic apparatuses through the selected antenna. Other components (RFIC, etc.) besides the antenna may be included as a portion of the antenna module 2297.

Some of the components may be connected to each other and exchange signals (instructions, data, etc.) through a communication scheme between peripheral devices (a bus, general purpose input and output (GPIO), a serial peripheral interface (SPI), a mobile industry processor interface (MIPI), etc.)

Commands or data may be transmitted or received between the electronic apparatus 2201 and the external electronic apparatus 2204 through the server 2208 connected to the second network 2299. The other electronic apparatuses 2202 and 2204 may be apparatuses of the same type as or different type from the electronic apparatus 2201. All or some of the operations executed in the electronic apparatus 2201 may be executed in one or more of the other electronic apparatuses 2202, 2204, and 2208. For example, when the electronic apparatus 2201 needs to perform certain functions or services, the electronic apparatus 2201 may request one or more other electronic apparatuses to perform some or all of the functions or services instead of directly executing the functions or services. One or more other electronic apparatuses that have received the request may execute an additional function or service related to the request, and may transfer a result of the execution to the electronic apparatus 2201. To this end, cloud computing, distributed computing, and/or client-server computing technologies may be used.

Figure 15:
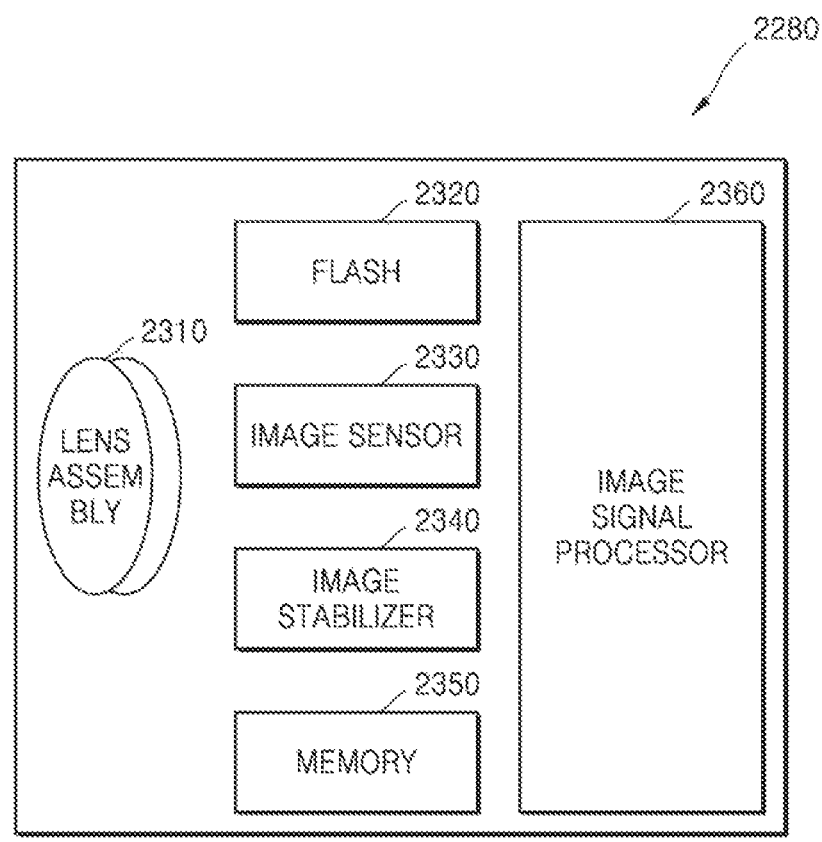
FIG. 15 is a block diagram showing a schematic configuration of a camera module included in the electronic apparatus of FIG. 14.

FIG. 15 is a block diagram showing a schematic configuration of a camera module included in the electronic apparatus of FIG. 14. Referring to FIG. 15, the camera module 2280 may include a lens assembly 2310, a flash 2320, an image sensor 2330, an image stabilizer 2340, a memory 2350 (buffer memory, etc.), and/or an image signal processor 2360. The lens assembly 2310 may collect light emitted from a subject to be image captured, and may include the above-described meta optical device 100 or a meta optical device in a modified form thereof. The lens assembly 2310 may include one or more refractive lenses and a meta optical device. The meta optical device included in the lens assembly has a predetermined phase profile, and the efficiency of providing the desired phase profile is high by setting the width ranges of the nanostructures disposed in a region having a large phase derivative (deflection angle) and the nanostructures disposed in a region having a small phase derivative, differently. The lens assembly 2310 including the meta optical device implements desired optical performance and may have a short optical length.

In addition, the camera module 2280 may further include an actuator. The actuator may change a position of lens elements constituting the lens assembly 2310 for zooming and/or autofocus (AF), and may adjust a separation distance between the lens elements.

The camera module 2280 may include a plurality of lens assemblies 2310, and in this case, may be a dual camera, a 360-degree camera, or a spherical camera Some of the plurality of lens assemblies 2310 may have the same lens properties (field of view, focal length, autofocus, F Number, optical zoom, etc.) or different lens properties. The lens assembly 2310 may include a wide-angle lens or a telephoto lens.

The flash 2320 may emit light used to enhance light emitted or reflected from a subject. The flash 2320 may include one or more light emitting diodes (red-green-blue (RGB) LED, white LED, infrared LED, ultraviolet LED, etc.), and/or a xenon lamp. The image sensor 2330 may obtain an image corresponding to the subject by converting tight emitted or reflected from the subject and transferred through the lens assembly 2310 into an electrical signal. The image sensor 2330 may include one or a plurality of sensors selected from image sensors having different attributes, such as an RGB sensor, a black and white (BW) sensor, an IR sensor, or a UV sensor. Each of the sensors included in the image sensor 2330 may be implemented as a charged coupled device (CCD) sensor and/or a complementary metal oxide semiconductor (CMOS) sensor.

Also in the image sensor 2330, the meta optical device 100 described with reference to FIGS. 1 to 11D or a modified example thereof may be employed as a lens for condensing light from a subject to the sensor.

The image stabilizer 2340 may move one or a plurality of lenses or the image sensor 2330 included in the lens assembly 2310 in a specific direction in response to movement of the camera module 2280 or an electronic apparatus 2201 including the same, or may control an operating characteristic of the image sensor 2330 (adjustment of read-out timing, etc.) such that a negative effect due to movement is compensated. The image stabilizer 2340 may detect movement of the camera module 2280 or the electronic apparatus 2201 using a gyro sensor (not shown) or an acceleration sensor (not shown) arranged inside or outside the camera module 2280. The image stabilizer 2340 may be implemented optically.

In the memory 2350, some or all of the data obtained through the image sensor 2330 may be stored for the next image processing operation. For example, when a plurality of images are obtained at high speed, the obtained original data (Bayer-patterned data, high-resolution data, etc.) may be stored in the memory 2350 and only a low-resolution image is displayed, and then the memory 2350 may be used to transfer the original data of a selected image (user selection, etc.) may be transferred to the image signal processor 2360. The memory 2350 may be integrated into the memory 2230 of the electronic apparatus 2201 or may be configured as a separate memory that is independently operated.

The image signal processor 2360 may perform one or more image processes on an image obtained through the image sensor 2330 or image data stored in the memory 2350. The one or more image processes may include depth map generation, three-dimensional modeling, panorama generation, feature point extraction, image synthesis, and/or image compensation (noise reduction, resolution adjustment, brightness adjustment, blurring, sharpening, softening, etc.). The image signal processor 2360 may control (exposure time control, or read-out timing control, etc.) components (the image sensor 2330, etc.) included in the camera module 2280. An image processed by the image signal processor 2360 may be stored again in the memory 2350 for further processing or may be provided to external components (the memory 2230, the display device 2260, the electronic apparatus 2202, the electronic apparatus 2204, the server 2208, etc.) of the camera module 2280. The image signal processor 2360 may be integrated into the processor 2220 or may be configured as a separate processor that operates independently of the processor 2220. When the image signal processor 2360 is configured as a separate processor from the processor 2220, an image processed by the image signal processor 2360 may be displayed through the display device 2260 after further image processing by the processor 2220.

The electronic apparatus 2201 may include a plurality of camera modules 2280 having respective attributes or functions. In this case, one of the plurality of camera modules 2280 may be a wide-angle camera, and another may be a telephoto camera. Similarly, one of the plurality of camera modules 2280 may be a front camera, and another may be a rear camera.

Figure 16:
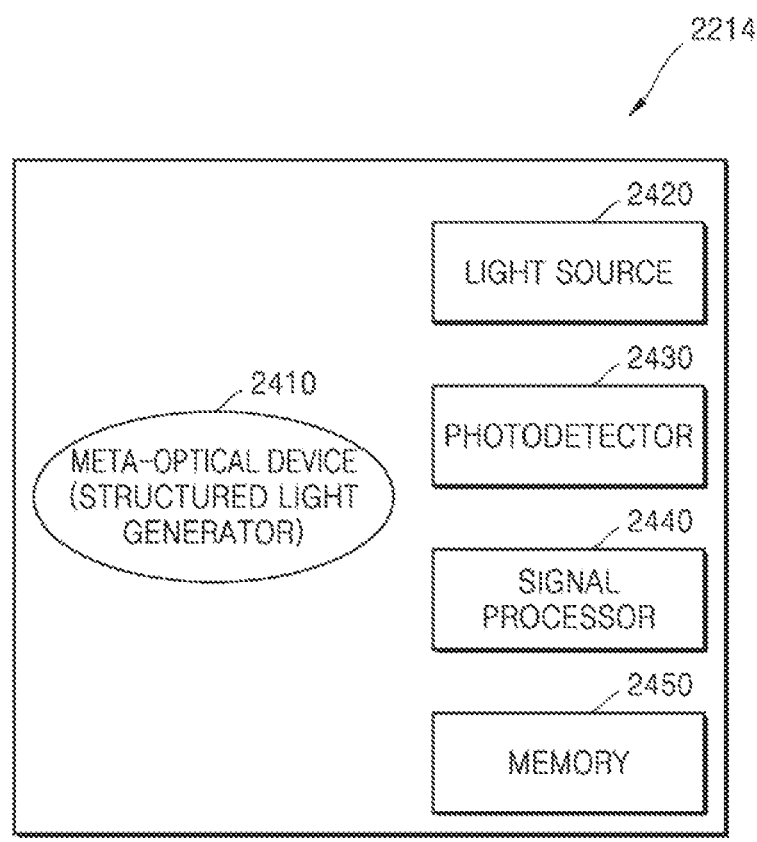
FIG. 16 is a block diagram showing a schematic configuration of a 3D sensor included in the electronic apparatus of FIG. 14.

FIG. 16 is a block diagram showing a schematic configuration of a 3D sensor included in the electronic apparatus of FIG. 14.

The 3D sensor 2214 irradiates certain light onto a subject and receives and analyzes light reflected by the subject to sense the shape and movement of the subject. The 3D sensor 2214 includes a light source 2420, a meta optical device 2410, a photodetector 2430, a signal processor 2440, and a memory 2450. As the meta optical element 2410, the meta optical element 101 described with reference to FIG. 12 with a phase profile set to function as a structured light generator may be employed.

The light source 2420 irradiates light to be used for analyzing the shape or position of a subject. The light source 2420 may include a light source that generates and irradiates light having a predetermined wavelength. The light source 2420 may include a light source such as a laser diode (LD), a light emitting diode (LED), a super luminescent diode (SLD) that generates and irradiates light in a wavelength band suitable for analysis of the position and shape of a subject, for example, light in an infrared band wavelength. The light source 2420 may be a laser diode of a variable wavelength. The light source 2420 may generate and irradiate light of a plurality of different wavelength bands. The light source 2420 may generate and irradiate pulsed tight or continuous light.

The meta optical device 2410 modulates light irradiated from a light source 2420 and transmits the modulated light to an object. The meta optical device 2410 modulates incident light such that the incident light has distribution having a certain pattern. The meta optical element 2410 may form structured light coded with predetermined position coordinates by bright and dark spots to be suitable for 3D shape analysis.

In the meta optical device 2410, as described above, since the shape distribution of the nanostructures is designed in consideration of phase derivatives as well as phase values for each position, the efficiency of forming the intended structured light pattern is high, and the accuracy of 3D information analysis on the subject can be improved.

The photodetector 2430 receives reflected light of light irradiated onto the subject through the meta optical device 2410. The photodetector 2430 may include an array of a plurality of sensors for sensing light, or may include only one sensor In the photodetector 2430, the meta optical device described with reference to FIGS. 1 to 11D may be employed as a lens for condensing a light reflected by a subject to the sensor.

The signal processor 2440 may analyze a shape of the subject by processing a signal sensed by the photodetector 2430. The signal processor 2440 may analyze a 3D shape including a depth position of the subject.

When a subject is irradiated with structured light, a depth position of the subject may be calculated from a pattern change of the structured light reflected by the subject, that is, a result of comparison with an incident structured light pattern. Depth information of the subject may be extracted by tracking a pattern change for each coordinate of the structured light reflected by the subject, and 3D information related to the shape and movement of the subject may be extracted from the depth information of the subject.

The memory 2450 may store programs and other data necessary for the operation in the signal processor 2440.

An operation result in the signal processor 2440, that is, information about the shape and position of the subject may be transmitted to another unit in the electronic apparatus 2201 or to another electronic apparatus. For example, this information may be used in the application 2246 stored in the memory 2230. Another electronic apparatus to which a result is transmitted may be a display device or a printer that outputs the result. In addition, the electronic apparatus may be self-driving devices such as driverless cars, autonomous vehicles, robots, drones, etc., smart phones, smart watches, mobile phones, PDAs, laptop computers, PCs, various wearable devices, other mobile or non-mobile computing devices, and IoT devices, but is not limited thereto.

Figure 17:
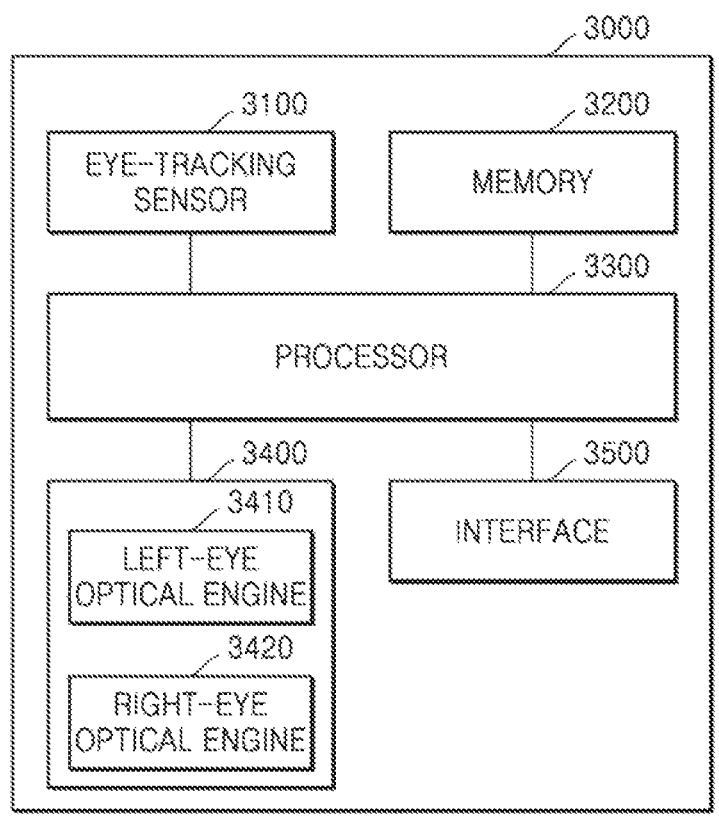
FIG. 17 is a block diagram showing a schematic configuration of an electronic apparatus according to another example embodiment.

FIG. 17 is a block diagram showing a schematic configuration of an electronic apparatus according to another example embodiment.

An electronic apparatus 3000 of FIG. 17 may be a glasses-type augmented reality device. The electronic apparatus 3000 includes a display engine 3400, a processor 3300, an eye-tracking sensor 3100, an interface 3500, and a memory 3200.

The processor 3300 may control the overall operation of the augmented reality device including the display engine 3400 by driving an operating system or an application program, and may process and calculate a variety of data including image data. For example, the processor 3300 may process image data including a left-eye virtual image and a right-eye virtual image rendered to have binocular parallax.

The interface 3500 is used for in putting/outputting data or operation commands from the outside, and may include, for example, a user interface such as a touch pad, a controller and control buttons can be controlled by a user. The interface 3500 may include a wired communication nodule such as a USB module or a wireless communication module such as a Bluetooth and may receive operation information of a user or data of a virtual image transmitted from an interface included in an external device through the interface 3500.

The memory 3200 may include an internal memory such as a volatile memory or a nonvolatile memory. The memory 3200 may store a variety of data, programs, or applications for driving and controlling an augmented reality device under the control of the processor 3300 and data of input/output signals or virtual images.

The display engine 3400 is configured to receive image data generated by the processor 3300 to generate light of a virtual image, and includes a left-eye optical engine 3410 and a right-eye optical engine 3420. Each of the left-eye optical engine 3410 and the right-eye optical engine 3420 includes a light source that outputs light and a display panel that forms a virtual image using light output from the light source, and has a similar function as a small projector. The light source may be implemented with, for example, an LED, and the display panel may be implemented with, for example, liquid crystal on silicon (LCoS).

The eye-tracking sensor 3100 may be mounted at a position where the pupils of a user wearing an augmented realty device can be tracked, and may transmit a signal corresponding to user's gaze to the processor 3300. The eye-tracking sensor 3100 may detect gaze information such as a gaze direction toward the user's eye, a pupil position of the user's eye, or coordinates of a center point of the pupil. The processor 3300 may determine a shape of eye movement based on the user's gaze information detected by the eye-tracking sensor 3100. For example, the processor 3300, based on gaze information obtained from the eye-tracking sensor, may determine various types of eye movement, including fixation to look at any one place, pursuit to follow moving objects, a saccade in which the gaze moves quickly from one gaze point to another gaze point.

Figure 18:
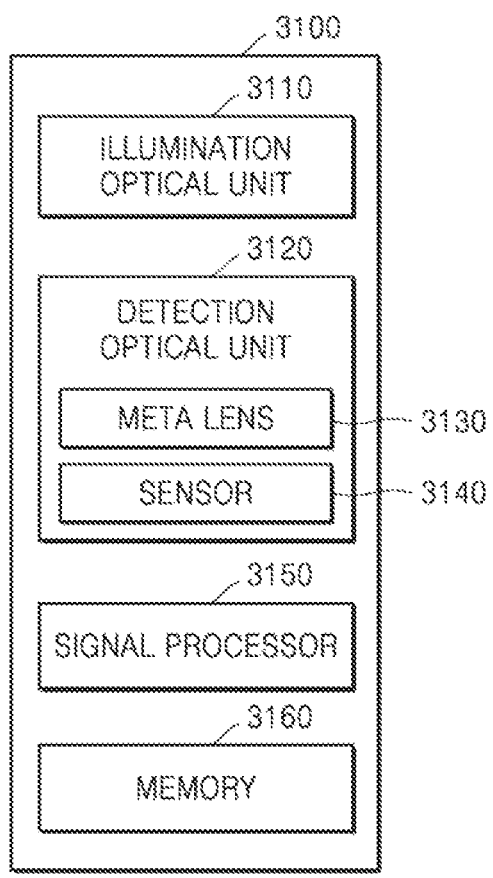
FIG. 18 is a block diagram showing a schematic configuration of an eye-tracking sensor included in the electronic apparatus of FIG. 17.

FIG. 18 is a block diagram showing a schematic configuration of an eye-tracking sensor included in the electronic apparatus of FIG. 17.

The eye-tracking sensor 3100 includes an illumination optical unit 3110, a detection optical unit 3120, a signal processor 3150, and a memory 3160.

The illumination optical unit 3110 may include a light source that irradiates light, for example, infrared light onto a subject position (user's eye). In addition, any one or a combination or a modified example of the meta optical device 100 described with reference to FIGS. 1 to 11D and the meta optical device 101 of FIG. 12 may be used for the illumination optical unit 3110. For example, the meta optical element 101 of FIG. 12 may be included in the illumination optical unit 3110 to irradiate a predetermined pattern light onto a subject position (user's eye).

The detection optical unit 3120 detects reflected light and may include a meta lens 3130 and a sensor 3140. The signal processor 3150 calculates a pupil position of the user's eye from a result of sensing by the detection optical unit 3120.

As the meta lens 3130, any one or a combination or modified example of the meta optical devices 100 described with reference to FIGS. 1 to 11D may be used. The meta lens 3130 may condense light from the subject to the sensor 3140. In the eye-tracking sensor 3100 positioned very close to the user's eyes, the deflection angle range for condensing light incident on the meta lens 3130 to the sensor 3140 may be as large as 30 degrees or more, the meta lens includes the nanostructures NS designed in consideration of not only the phase value but also the phase derivative, and can provide a good efficiency ever for a wide refraction angle distribution. Therefore, the accuracy of eye tracking may be improved.

While the above-described meta optical device and an electronic apparatus including the same have been described with reference to the example embodiments shown in the drawings, but the example embodiments are only examples, and it will be understood by those of ordinary skill in the art that various modifications and equivalent other embodiments may be provided. Therefore, the example embodiments should be considered from an illustrative point of view rather than a limiting point of view. The scope of the present specification is shown in the claims rather than the above description, and all differences within the scope equivalent thereto are to be interpreted as being included.

The above-described meta optical device has an improved efficiency in implementing an intended phase profile and optical performance thereby.

The above-described meta optical device can provide an improved efficiency even for a wide refraction angle distribution.

The above-described meta optical device may be used as a lens, a structured light generator, and a hologram pattern, and may be employed in various electronic apparatuses utilizing these.

It should be understood that example embodiments described herein should be considered in a descriptive sense only and not for purposes of limitation Descriptions of features or aspects within each example embodiment should typically be considered as available for other similar features or aspects in other embodiments.

While example embodiments have been described with reference to the figures, it will be understood by those of ordinary skill in the art that various changes in form and details may be made therein without departing from the spirit and scope as defined by the following claims.

What is claimed is:

1. A meta optical device comprising:
   a plurality of phase modulation regions respectively including a plurality of nanostructures that have shapes and arrangement based on a preset rule, the plurality of phase modulation regions being configured to modulate a phase of incident light of a preset wavelength band,
   wherein at least two phase modulation regions of the plurality of phase modulation regions have phase modulation ranges in a first direction that are same, wherein widths of the plurality of nanostructures included in the at least two phase modulation regions have ranges in the first direction that are different from each other, and wherein among the at least two phase modulation regions, a first range, which is a range of widths of nanostructures included in a first phase modulation region in the first direction, is greater than a second range, which is a range of widths of nanostructures included in a second phase modulation region in the first direction.

2. The meta optical device of claim 1, wherein the at least two phase modulation regions have gradients of a phase change in the first direction that are different from each other.

3. The meta optical device of claim 1, wherein the at least two phase modulation regions have angles of refraction of the incident light that are different from each other.

4. The meta optical device of claim 3, wherein among the at least two phase modulation regions, a phase modulation region in which an angle of refraction of the incident light is greater has a narrower width distribution.

5. The meta optical device of claim 1, wherein the plurality of phase modulation regions include a first phase modulation region having a circular shape and a second phase modulation region to an N-th phase modulation region respectively having an annular shape sequentially surrounding the first phase modulation region of the circular shape, where N is an integer greater than two, and wherein the first direction is a radial direction away from a center of the first phase modulation region of the circular shape.

6. The meta optical device of claim 5, wherein phase modulation ranges in the second to N-th phase modulation regions respectively are 2π.

7. The meta optical device of claim 5, wherein the shapes and the arrangement of the plurality of nanostructures of each of the first to N-th phase modulation regions are set such that an angle of refraction of the incident light gradually increases in the first to N-th phase modulation regions.

8. The meta optical device of claim 7, wherein the first phase modulation region is provided at a central portion of the meta optical device and the second phase modulation region is provided at a peripheral portion of the meta optical device.

9. The meta optical device of claim 8, wherein the first range is 1.2 times to 1.6 times the second range.

10. The meta optical device of claim 9, wherein the first range ranges from a first width to a second width, and wherein the second range ranges from a third width to a fourth width, and wherein the first width is less than the third width and the second width is greater than the fourth width.

11. The meta optical device of claim 5, wherein the shapes and the arrangement of nanostructures of each of the first to N-th phase modulation regions are set such that an angle of refraction of the incident light changes non-linearly in the first to N-th phase modulation regions.

12. The meta optical device of claim 11, wherein among the first to N-th phase modulation regions, a first range, which is a range of widths of nanostructures included in a phase modulation region in which the incident light is refracted at a first angle, is greater than a second range, which is a range of widths of nanostructures included in a phase modulation region in which the incident light is refracted at a second angle, the second angle being greater than the first angle.

13. The meta optical device of claim 12, wherein the first range is 1.2 times to 1.6 times the second range.

14. The meta optical device of claim 5, wherein the meta optical device is a lens having a field of view of 40 degrees to 170 degrees.

15. The meta optical device of claim 1, wherein the shapes and the arrangement of the plurality of nanostructures included in the plurality of phase modulation regions are set such that the meta optical device is configured to form structured light.

16. The meta optical device of claim 15, wherein among the plurality of phase modulation regions, a range of widths of nanostructures included in a phase modulation region in which a gradient of a phase change in the first direction is a first gradient is less than a range of widths of nanostructures included in a phase modulation region in which a gradient of a phase change in the first direction is a second gradient, the first gradient being greater than the second gradient.

17. The meta optical device of claim 1, wherein shapes and arrangement of nanostructures in each of the plurality of phase modulation regions are set such that the meta optical device is configured to form a hologram pattern.

18. The meta optical device of claim 17, wherein among the plurality of phase modulation regions, a range of widths of nanostructures included in a phase modulation region in which a gradient of a phase change in the first direction is a first gradient is less than a range of widths of nanostructures included in a phase modulation region in which a gradient of a phase change in the first direction is a second gradient, the first gradient being greater than the second gradient.

19. The meta optical device of claim 1, wherein the preset wavelength band includes at least one of an infrared wavelength band and a visible light wavelength band.

20. The meta optical device of claim 1, wherein the plurality of nanostructures respectively have a shape dimension less than $\lambda 0$ that is a center wavelength of the preset wavelength band.

21. The meta optical device of claim 1, wherein heights of the plurality of nanostructures are greater than $\lambda 0/2$ and less than $4\lambda 0$, where $\lambda 0$ is a center wavelength of the preset wavelength band.

22. An electronic apparatus comprising:
a meta optical device comprising:
a plurality of phase modulation regions respectively including a plurality of nanostructures that have shapes and arrangement based on a preset rule, the plurality of phase modulation regions being configured to modulate a phase of incident light of a preset wavelength band, wherein at least two phase modulation regions of the plurality of phase modulation regions have phase modulation ranges in a first direction that are same, and wherein widths of the plurality of nanostructures included in the at least two phase modulation regions have ranges in the first direction that are different from each other, and wherein among the at least two phase modulation regions, a first range, which is a range of widths of nanostructures included in a first phase modulation region in the first direction, is greater than a second range, which is a range of widths of nanostructures included in a second phase modulation region in the first direction.

23. A meta optical device comprising:
a plurality of phase modulation regions respectively including a plurality of nanostructures that have shapes and arrangement based on a preset rule, the plurality of phase modulation regions being configured to modulate a phase of incident light of a preset wavelength band, wherein at least two regions of the plurality of phase modulation regions have phase modulation ranges in a first direction that are same, and wherein a range of widths of nanostructures included in each of the plurality of phase modulation regions decrease from a phase modulation region provided at a central portion of the meta optical device to a phase modulation region provided at a peripheral portion of the meta optical device.

* * * * *